United States Patent Office 3,779,995
Patented Dec. 18, 1973

3,779,995
THERMOPLASTIC AND THERMOSETTING ALLYL CARBAMATE RESINS
Bobby F. Dannels and Alvin F. Shepard, Grand Island, N.Y., assignors to Hooker Chemical Corporation, Niagara Falls, N.Y.
No Drawing. Continuation-in-part of abandoned application Ser. No. 42,883, June 2, 1970, which is a continuation-in-part of application Ser. No. 788,008, Dec. 30, 1968, now Patent No. 3,557,249. This application Dec. 6, 1971, Ser. No. 205,378
Int. Cl. C08g 22/16, 51/40
U.S. Cl. 260—77.5 MA
33 Claims

ABSTRACT OF THE DISCLOSURE

Novel allyl resins are produced by reacting at an elevated temperature an addition product of an allylic alcohol and an organic diisocyanate. The products may be produced in one step by heating an allyl carbamate intermediate prepared from the components in a ratio sufficient to provide about 1.4 to about 2.2 isocyanato groups per hydroxyl group, or in two steps by reacting an intermediate prepared from a stiochiometric mixture of components with additional diisocyanate so that the total ratio of components in the product is sufficient to provide about 1.4 to about 2.2 isocyanato groups per hydroxyl group. When mixed with a free radical catalyst the products of the invention are useful for many purposes such as in the production of reinforced and laminated plastic articles, and in the preparation of molded articles.

REFERENCE TO PRIOR APPLICATION

This is a continuation-in-part of application Ser. No. 42,883, filed June 2, 1970, now abandoned, which is a continuation-in-part of application Ser. No. 788,008, filed Dec. 30, 1968, and now Pat. No. 3,557,249.

BACKGROUND OF THE INVENTION

Allyl resins have achieved a strong position as molding materials for electrical and electronic parts and in the production of reinforced and laminated plastic articles. They are noted for their excellent shelf stability, controllable flow characteristics, good physical properties, low mold shrinkage, absence of post-mold deformation, insulating properties, high-temperature stability, and resistance to most chemicals and moisture. However, these resins are also characterized by a relatively high cost due to the manner in which they are produced. For example, diallyl phthalate prepolymer, the most widely used allylic compound, is produced by the partial polymerization of diallyl phthalate followed by fractional precipitation. The prepolymer is a solid resin which can be pulverized and handled like a phenolic, i.e., it softens or melts at higher temperatures, and becomes thermosetting when mixed with peroxide catalysts.

While the art abounds with allylated elastomers, these elastomers do not have the processing qualities of diallyl phthalate prepolymer. Many are liquid resins which cannot be pulverized and tend to yield soft; sticky materials. Others, exemplified by U.S. Pat. 2,464,519, require the prolonged action of heat and pressure (e.g., 24 hours at 90–95 degrees centigrade) to effect curing. Such a cure speed is insufficient for the majority of commercial applications. The present invention provides low cost, solid, fusible allyl resins which can be cured at commercially practical rates such as 20–100 seconds at 165 degrees centigrade.

It is an object of this invention to provide novel thermosetting allyl compositions and processes for producing them. It is another object of this invention to provide novel, solid, fusible allyl compositions which can be employed in the production of reinforced and laminated plastic articles and in the preparation of molded articles. A further object of the invention is to provide compositions similar to or better than diallyl phthalate prepolymer in electrical and processing qualities. A still further object of the invention is to provide low cost compositions similar to diallyl phthalate prepolymer. The invention also has the object of providing compositions which will cure at commercially practical rates. These and other objects of the invention will become apparent upon a consideration of the following specification.

SUMMARY OF THE INVENTION

This invention relates to novel thermoplastic and thermosetting allyl compositoins. More particularly, this invention relates to a novel thermoplastic resinous product of the reaction at elevated temperatures of an addition product of at least about a stiochiometric proportion of an organic diisocyanate with allyl alcohol, methallyl alcohol or mixtures thereof, wherein the total ratio of components in said product is sufficient to provide about 1.4 to about 2.2 isocyanato groups per hydroxyl group. The addition product is an allyl carbamate prepared from a mixture of allyl alcohol, methallyl alcohol or mixtures thereof with an organic diisocyanate in a ratio of from about 1 to about 2.2 isocyanato groups per hydroxyl group. The final product can be produced by heating an intermediate that contains all the components in sufficient proportion to provide about 1.4 to about 2.2 isocyanato groups per hydroxyl group, preferably about 1.7 to about 1.96. The final product can also be produced by reacting an intermediate prepared with at least a stiochiometric proportion of allylic alcohol with additional diisocyanate to provide about 1.4 to about 2.2 isocyanato groups per hydroxyl group. When mixed with a free radical catalyst, the resulting polymerizable composition is thermosettable.

DESCRIPTION OF THE INVENTION

In general, the objects of this invention are accomplished by first preparing an intermediate allyl carbamate by reacting an organic diisocyanate with allyl alcohol, methallyl alcohol or mixtures thereof. Crotonyl alcohol can also be employed but is less preferred. It is preferred to employ a diisocyanate in which one isocyanato group is more reactive than the other isocyanato group. Suitable organic diisocyanates include the toluene diisocyanates, particularly 2,4 - toluene, diisocyanate, 2,6 - toluene diisocyanate and mixtures of the two isomers, especially mixtures of 80 percent of the 2,4-isomer and 20 percent of 2.6-isomer. Crude mixtures which are commercially available are also useful. Other suitable isocyanates include methylene bis(4-phenyl isocyanate); hexamethylene diisocyanate; dimer acid diisocyanate; p-phenylene diisocyanate; as well as crude commercial mixtures of such organic isocyanates. The preferred organic diisocyanate is toluene diisocyanate.

The allylic alcohol and the organic diisocyanate are reacted in a suitable proportion to provide a ratio of about 1.4 to about 2.2 isocyanato groups per hydroxyl group.

The final product can be produced by several reaction processes as follows:

(1) One-step addition of diisocyanate

All the allylic alcohol and the diisocyanate are mixed to produce an intermediate allyl carbamate. When toluene diisocyanate and allyl alcohol are employed, the intermediate produced by this method has the formula:

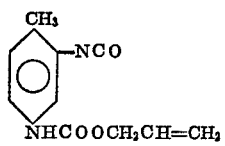

The product of the invention is produced by reacting the mono-allyl carbamate at elevated temperature. The product of this method preferably is prepared from components in a ratio to provide about 1.7 to about 1.96 isocyanato groups per hydroxyl group.

Excellent temperature control is achieved with this method by forming the intermediate allyl carbamate in a first vessel, and thereafter passing the intermediate into a heated mass of the final product in a second vessel so that production of additional final product is accomplished "continuously" upon introduction of the intermediate to the heated vessel. This method is superior to heating the entire mass of intermediate because of the exothermic nature of the reaction.

(2) Two-step addition of diisocyanate

At least a stiochiometric proportion of the allylic alcohol and the diisocyanate are mixed to produce an intermediate allyl carbamate. When toluene diisocyanate and allyl alcohol are mixed in stoichiometric proportions, the intermediate has the formula:

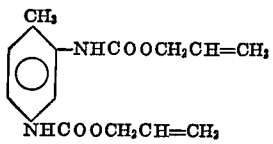

The product of the invention is produced by reacting at elevated temperature the foregoing intermediate with additional diisocyanate sufficient to provide a total of about 1.4 to about 2.2 isocyanato groups per hydroxyl group. In this method the intermediate can be heated to the elevated temperature and then the diisocyanate can be added to the intermediate. Alternatively, the diisocyanate can be mixed with the intermediate and the entire reaction mixture can be heated. Temperature control of the exothermic reaction is more difficult by the latter method. In still a further variation of the two-step method, the diisocyanate is added to the intermediate while the latter component is being heated. This variation lends itself best to a continuous process such as in a tubular reactor where superior temperature control is possible.

In forming either intermediate, the temperature can be maintained at about 10 to about 140 degree centigrade, preferably at about 20 to about 70 degrees centigrade. When toluene diisocyanate is used, the temperature is preferably about 10 to about 50 degrees centigrade. Because the reaction is exothermic, external cooling is provided. It is preferred, although not essential, to employ a catalyst such as N-methyl morpholine, pentaerythritol, lead linoleate, sodium phenate, bis-tert-butyltin oxide, tributylphosphine, triethylene diamine, and mixtures thereof, in forming the intermediate allyl carbamate.

The allyl carbamate intermediate can be represented by the formula:

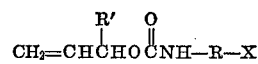

wherein R is a radical obtained by removing two isocyanato radicals from an organic diisocyanate, R' is hydrogen or methyl and X is an isocyanato group (NCO) or another radical of the formula:

wherein R' is as defined hereinbefore.

The intermediate allyl carbamate is heated at about 140 to about 235 degrees centigrade, preferably at about 160 to about 200 degrees centigrade and preferably in the presence of one or more of the above-described catalysts. After an induction period, an exothermic reaction occurs which is allowed to proceed until there are substantially no free NCO groups left in the product, i.e., there is less than about one weight percent free NCO groups in the product. The product of the invention contains less than about one weight percent free NCO groups as determined either by titration or the absence of an infrared spectra band at $2270^{-1}$ cm. The infrared spectrum has strong carbonyl absorption at 1700–1730 cm.$^{-1}$ which band has at least two shoulders. There is also a strong band at about 1400 cm.$^{-1}$ which is molecular weight dependent. Nuclear magnetic resonance analysis of the resins show that the allyl unsaturation is present in an amount substantially equivalent to the allyl alcohol employed in the preparation. Thus, the C=C does not enter into the resin-forming reaction. An allophanate structure has been ruled out because it is thermally unstable and rearranges at temperatures normally encountered in the preparation of the resin. The uretidenedione or dimeric structures have also been shown to be unstable under the normal preparation conditions. Small amounts of carbodiimide are formed at high reaction temperatures (220 degrees centigrade) and when high catalyst concentrations are employed. This is evidenced by the appearance of an infrared band at about 2120 cm.$^{-1}$ and the evolution of carbon dioxide. No off-gas is detected at lower temperatures. Finally, the resulting resin can be partially broken down into the starting reactants by heating the resin at about 210 to about 220 degrees centigrade under a high vacuum such as about 1 to 10 mm. of mercury.

In another aspect of the invention, the allylic resin can be prepared in the presence of an allylic monomer, such as diallyl phthalate. The presence of the allylic monomer serves to reduce the melting point of the product to increase its utility in molding processes. The use of the allylic monomer permits the use of higher ratios of isocyanate to alcohol which increases cure speed of the resulting product but also increases the melting point of the product. Suitable allylic monomers include diallyl phthalate, diallyl isophthalate, diallyl maleate, diallyl chlorendate, diethylene glycol bis(allyl carbonate), triallyl cyanurate, and the like. Generally, the amount of allylic monomer is about 5 to about 25 weight percent based on the total weight of the monomer and intermediate, and preferably about 8 to about 15 weight percent.

In another aspect of the invention, it has been found that the speed of cure of the polymerizable mixtures of the resin of this invention and a free radical catalyst can be accelerated if the resin is vacuum stripped at the end of the resin preparation. The vacuum applied can be about 1 to about 200 mm. of mercury, preferably about 50 mm. or less.

The above-described products and mixtures thereof are converted to insoluble, infusible products by heating the products in the presence of one or more free radical catalysts. Suitable catalysts benzoyl peroxide, 2,4-dichlorobenzoyl peroxide, p-chlorobenzoyl peroxide, acetyl peroxide, methylethyl ketone peroxide, tert-butylperoxybenzoate, 2,5-dimethyl-2,5-bis(benzoylperoxy) hexane, tert-butylperoxyoctoate, di-tert-butyldiperoxy phthalate di - tert - butyl peroxide, dicumyl peroxide, and the like. The free radical catalysts are generally employed in amounts ranging from about 0.1 to about 8 weight percent based on the total weight of the composition and preferably from about 2 to about 5 percent.

The compositions of the invention are useful in the preparation of plastic articles in general, reinforced plastic articles containing a reinforcement such as cloth, glass fibers in the form of roving, individual glass fibers, etc., and laminates or other filled resin compositions. Suitable reinforcements for preparing the reinforced articles and laminates include textile fibers, glass fibers or cloth, roving, wood flour, mineral fillers, etc. Castings or laminates can also be prepared from the compositions of the present invention if they are diluted with sufficient diallyl phthalate or other reaction monomer. In general, well-known processes of the prior art can be used for preparing the above-mentioned plastic articles, reinforced plastic articles, laminates or other filled resin compositions, and castings, with the exception of substituting the compositions of the invention for that conventionally used. Usually, other changes in the process are not necessary.

The following are examples of suitable reinforcing media and fillers that can be used with the compositions of the invention: glass fibers, glass mats, glass cloth, synthetic fibers such as Orlon, mineral fibers such as asbestos, natural fibers such as cotton, silk and wool, metallic fibers such as aluminium and steel, inorganic materials such as calcium carbonate, clay and pigments, and organic materials such as wood flour, cotton and rayon flock, sisal fibers and dyes.

The following examples serve to further illustrate the invention but are not intended to limit it. Throughout this specification and claims all parts are by weight and temperatures are in degrees centigrade unless otherwise indicated.

EXAMPLE 1

A charge of 150 parts of toluene diisocyanate (80%/20% of 2,4,-/2,6-isomer mixture) was placed in a stirred glass reactor blanketed with nitrogen. A charge of 50 parts of allyl alcohol was slowly added and cooling was provided to maintain the temperature below 50 degrees centigrade. After the addition was complete, the mixture was allowed to cool to room temperature. After 16 hours at room temperature, a sample was removed and found to have 18.2 percent NCO groups by titration (theory is 18.1 percent). A portion of this material was stored under nitrogen in glass for 20 days at room temperature and re-analysis showed 18.1 percent of NCO groups, indicating that this product is stable at room temperature.

EXAMPLE 2

Following the procedure of Example 1, an intermediate allyl carbamate is produced by employing mthallyl alcohol in place of the allyl alcohol.

EXAMPLE 3

An intermediate allyl carbamate was produced by mixing 1220 parts of allyl alcohol, 3660 parts of toluene diisocyanate (80%/20% of 2,4-/2,6-isomer mixture) and 3.8 parts of N-methyl morpholine and providing cooling to maintain the temperature below 50 degrees centigrade for 8 hours. The resulting intermediate was added to 1220 parts of diallyl phthalate, which was being maintained at 170–190 degree centigrade, over a 3 hour period and the temperature was maintained for an additional ½ hour. The product was transferred onto flaking rolls and allowed to harden. It was thereafter ground, mixed with 3.0 percent tert-butylperbenzoate and found to cure in 50 seconds at 160 degrees centigrade, thus demonstrating its usefulness as a molding compound binder.

The intermediate was also prepared employing the 1220 parts of diallyl phthalate at the beginning of the reaction. The 3.8 parts of N-methyl morpholine was then added to the intermediate at room temperature and the mixture was heated at 170–190 degrees centigrade for 3.5 hours. The resulting polymerizable product was transferred onto flaking rolls and allowed to harden. Thereafter it was ground, mixed with 3 percent tert-butylperbenzoate and found to cure in 50 seconds at 160 degrees centigrade.

EXAMPLE 4

Following the procedure of Example 1, 2090 parts of toluene diisocyanate (80%/20% of 2,4-/2,6-isomer mixture) were reacted with 819 parts of allyl alcohol. Three parts of N-methyl morpholine were added to the product at room temperature and then about 400 parts of the mixture were transferred to another reactor. Three parts of pentaerythritol were added to the second reactor which was heated to 140 degrees centigrade. A highly exothermic reaction resulted with the temperature rising to 200 degrees centigrade. After the mixture was cooled to 180 degrees centigrade, the remainder of the product from the first reactor was added over the course of 2 hours and the temperature was maintained at 180 degrees centigrade for an additional 1½ hours. The resulting product was poured into a pan and allowed to harden. The product was a readily grindable solid with a melting point of 86–100 degrees centigrade, a molecular weight of 590 and contained less than 0.3 percent free isocyanato groups. The product was ground, mixed with 3 percent tert-butylperbenzoate and found to cure in less than 40 seconds at 160 degrees centigrade, thus demonstrating its usefulness as a molding compound binder.

EXAMPLE 5

A 10 gallon Pfaudler kettle with auxiliary oil heater, condenser, receiver and vacuum equipment was dried and flushed with nitrogen. It was then charged with 4144 parts of diallylphthalate, 6129 parts of toluene diisocyanate (80%/20% of 2,4-/2,6-isomer mixture), 15.3 parts of N-methylmorpholine and 15.3 parts of pentaerythritol. A charge of 4086 parts of allyl alcohol was pumped into the kettle over a 2½ hours period and the temperature reached 55 degrees centigrade with room temperature oil acting as a coolant. The kettle was allowed to stand overnight and then was heated to 60 degrees cent igrade for 2 hours. Thereafter, the kettle was heated to 160 degrees centigrade and an additional 6129 parts of toluene diisocyanate was added over a 100 minute period. During the first 20 minutes of addition, the temperature fell to 155 degrees centigrade and then there was an exotherm to 173 degrees centigrade. For the remainder of the addition, the temperature was 165–173 degrees centigrade. After the addition was complete, the mixture was stirred for two hours at 160–165 degrees centigrade. A vacuum of 28 inches was applied to the kettle and the reaction mixture heated to 200 degrees centigrade over a 40 minute period and held at that temperature for an additional hour. The vacuum was released by introducing nitrogen into the kettle and the resulting polymerizable product was transferred onto flaking rolls. The product was a light amber, brittle resin amounting to 19445 parts. This was pulverized and converted into a molding compound of the following formula by parts:

| | |
|---|---|
| Resin | 675 |
| Silicate filler | 235 |
| ⅛ in. glass fiber | 550 |
| Calcium stearate | 13 |
| Green dye mix | 60 |
| Dicumyl peroxide | 20 |
| Vinyl silane | 7 |

The following properties were found:

Plasticity:

| | |
|---|---|
| 36 | 9.0 |
| 50 | 7.8 |
| 75 | 5.2 |
| 100 | 3.1 |
| S cup cure _____sec__ | 40 |
| Flexural strength _____lbs./sq. in__ | 16324 |
| Tensile strength _____lbs./sq. in__ | 9548 |
| Impact strength (Izod) _____ft. lb./in__ | 0.6 |

EXAMPLE 6

Example 5 was repeated except that after the additional charge of diisocyanate, the mixture was maintained at about 170 degrees centigrade for about 10 hours under a nitrogen atmosphere and then the product was directly transferred onto the flaking rolls.

EXAMPLE 7

A charge of 1742 parts of toluene diisocyanate (80%/20% of 2,4-/2,6-isomer mixture) was placed into a stirred glass reactor blanketed with nitrogen and 640 parts of allyl alcohol were slowly added. Cooling was provided to maintain the temperature below 40 degrees centigrade. After 16 hours, the free isocyanato content was determined to be 15.7 percent (theory: 15.8 percent). Two parts of pentaerythritol and 2 parts of N-methylmorpholine were added and the temperature slowly raised to 140 degrees centigrade. After an induction time of 45 minutes, a highly exothermic reaction resulted with the temperature increasing to 220 degrees centigrade. Cooling was applied to bring the temperature to 180 degrees centigrade and after 1 hour, the product was poured into a pan to harden. The solid product had a molecular weight of 600, a free isocyanato content of less than 0.3 percent, a melting point of 75-97 degrees centigrade, and was easily grindable into a fine powder.

The resin was pulverized and converted into a molding compound of the following formula:

| | Parts |
|---|---|
| Resin | 30.6 |
| ⅛ inch glass fiber | 42.0 |
| Silicate fillers | 21.4 |
| Lubricant | 1.1 |
| Diallyl phthalate monomer | 1.5 |
| Vinyl silane | 1.9 |
| Documyl peroxide | 1.5 |

Test specimens cured readily, requiring only about 50 seconds at 165 degrees centigrade for cure of the plasticity cup. Rapid cures were similarly obtained when the dicumyl peroxide was replaced with tert-butyl hydroperoxide or benzoyl peroxide.

A molding compound was also prepared by the foregoing formula in which diallyl phthalate prepolymer replaced the resin of this invention. The table below compares the molded properties of the cured test specimens.

TABLE I

| Properties | Resin | Diallyl phthalate prepolymer |
|---|---|---|
| Heat distortion temperature, °F | 430 | 330 |
| Flexural strength, pounds/sq. inch | 13,000 | 17,000 |
| Impact strength, foot lbs./inch | 0.53 | 0.50 |
| Dissipation factor, 1Mc | 0.008 | 0.014 |
| Humid insulation resistance in ohms, 720 hours | $8 \times 10^8$ | $7 \times 10^8$ |
| Arc resistance, seconds | 139 | 130 |

The foregoing results demonstrate that the resin of this invention closely resembles or surpasses the high-cost conventional diallyl phthalate prepolymer resin in its molded properties.

EXAMPLE 8

Into a 12 liter glass reactor fitted with an efficient stirrer, a thermometer and a reflux condenser there was placed 1160 parts of diallyl phthalate, 1160 parts of allyl alcohol and 9.2 parts of triethylenediamine. 1740 parts of toluene diisocyanate (80/20 isomer mixture) were then added slowly with the temperature maintained at 50-60 degrees centigrade. One hour after the addition was complete, the mixture was heated to 160 degrees centigrade and an additional 1914 parts of toluene diisocyanate were added during a two hour period. The mixture was heated at 160 degrees centigrade for an additional hour, poured from the reactor and allowed to cool.

A sample of the above-described resin was subjected to gel permeation chromatography. The peaks of the resulting curve were assigned as follows:

| Elution count: | Component |
|---|---|
| 23–24 | Free toluene diisocyanate. |
| 30–31 | Diallylphthalate. |
| 28–29 | Diallylurethane of toluene diisocyanate. |
| 25.5–26 | Isocyanurate of the formula. |

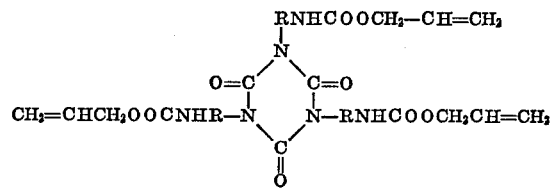

where R=tolylene radical.

24–25 _____ Resinous product the structure of which has not been determined precisely may either be tetramer having cyclic structure of the trimer or be composed of two joined isocyanurate rings.

A 20 gram sample of the foregoing resin was separated into the following seven fractions by precipitation from carbon tetrachloride.

| Fraction | Weight | M.P. | M.W. | Component |
|---|---|---|---|---|
| 1 | 1.1 | >270 | 5,390 | Resin. |
| 2 | 4.6 | 250-270 | 2,060 | Do. |
| 3 | 1.0 | 195-204 | 1,370 | Do. |
| 4 | 0.6 | 183-162 | 817 | Tetramer or 2 isocyanurate rings. |
| 5 | 0.4 | 100-114 | 587 | Trimer. |
| 6 | 7 | 56-91 | 281 | Diallylurethane of TDI. |
| 7 | 4 | Oil | 252 | Diallylphthalate. |

Each fraction was analyzed by gel permeation chromatography. The results favor the joined isocyanurate structure for fraction 4.

The above-described fractions were cured on a hot plate at 165 degrees centigrade, admixed with 3 weight percent dicumyl peroxide with the following results:

Fraction: Result
1 ---- Mixed with diallylphthalate so fraction would melt at 165 degrees centigrade; cured in 30–40 seconds.
2 ---- Mixed with diallylphthalate so fraction would melt at 165 degrees centigrade; cured in 30–40 seconds.
3 ---- Mixed with diallylphthalate so fraction would melt at 165 degrees centigrade; cured in 30–40 seconds.
4 ---- Mixed with diallylphthalate so fraction would melt at 165 degrees centigrade; cured in 30–40 seconds.
5 ---- 60 seconds—rigid product.
6 ---- >15 minutes—cheesy product.
7 ---- Do.

EXAMPLE 9

To 16 weight percent solution of the product of Example 5 in methylene chloride there was added 0.8 percent of the following UV sensitizers:

Michler's ketone
Ethyl Michler's ketone
2-methyl anthraquinone

A small amount of xylene was added to help dissolve the sensitizers.

A coating of each solution was applied to small copper panels. After drying, the coating was covered with a mask and exposed to ultraviolet light for five seconds. They were then developed by spraying and rinsing with methylene chloride. All panels except the one prepared with 2-methylanthraquinone showed a well defined image. In the case of the 2-methylanthraquinone, part of the image had washed off, showing incomplete curing.

The foregoing results show the compositions of the invention are useful in the process for producing printed circuit boards from metal coated plastics by the photo-resist technique.

Various changes and modifications can be made in the process and products of this invention without departing from the spirit and scope of the invention. The various embodiments of the invention disclosed herein serve to further illustrate the invention, but are not intended to limit it.

What is claimed is:

1. The product of reacting at a temperature of about 140 to about 235 degrees centigrade an addition product consisting essentially of allyl alcohol, methallyl alcohol or mixtures thereof and an organic diisocyanate in a proportion of about 1.4 to about 2.2 isocyanato groups per hydroxyl group, until there is less than about one weight percent free NCO groups in said product.

2. The product of claim 1 wherein the diisocyanate is toluene diisocyanate.

3. The product of claim 1 wherein the reaction is carried out in the presence of about 5 to about 25 weight percent of a polyfunctional allylic monomer based on the total weight of monomer and intermediate.

4. The product of claim 3 wherein the allylic monomer is diallyl phthalate.

5. The thermosettable composition comprising the product of claim 1 and a free radical catalyst.

6. A molding compound comprising the thermosettable composition of claim 5 and reinforcing media and fillers therefor.

7. A molded article comprising the polymerized composition of claim 6.

8. A reinforced plastic article comprising the polymerized composition of claim 5 and a reinforcing medium therefor.

9. A laminated article comprising a plurality of layers of reinforcing medium and as a binder therefor a polymerized composition of claim 5.

10. A process which comprises mixing a free radical catalyst with the product of claim 2 and polymerizing the product by heating at an elevated temperature.

11. The process of claim 10 wehrein the diisocyanate is toluene diisocyanate.

12. The product of claim 1 wherein the reaction is conducted in the presence of N-methyl morpholine.

13. The product of claim 1 wherein the reaction is conducted in the presence of N-methyl morpholine and pentaerythritol.

14. The product of reacting at a temperature of about 140 to about 235 degrees centigrade (1) an addition product of components consisting essentially of at least a stoichiometric proportion of allyl alcohol, methallyl alcohol or mixtures thereof and an organic diisocyanate, with (2) additional diisocyanate sufficient to provide a total of about 1.4 to about 2.2 isocyanato groups per hydroxyl group, until there is less than about one weight percent free NCO groups in said product.

15. The product of claim 14 wherein the diisocyanate is toluene diisocyanate.

16. The product of claim 14 wherein the reaction is carried out in the presence of about 5 to about 25 weight percent of a polyfunctional allylic monomer based on the total weight of monomer and intermediate.

17. The product of claim 16 wherein the allylic monomer is diallyl phthalate.

18. The product of claim 14 wherein the reaction is conducted in the presence of N-methyl morpholine.

19. The product of claim 14 wherein the reaction is conducted in the presence of N-methyl morpholine and pentaerythritol.

20. The product of claim 14 wherein the reaction is conducted in the presence of triethylene diamine.

21. The thermosettable composition comprising the product of claim 14 and a free radical catalyst.

22. A molding compound comprising the thermosettable composition of claim 21 and reinforcing media and fillers therefor.

23. A molded article comprising the polymerized composition of claim 22.

24. A reinforced plastic article comprising the polymerized composition of claim 21 and a reinforcing medium therefor.

25. A laminated article comprising a plurality of layers of reinforcing medium and as a binder therefor a polymerized composition of claim 21.

26. A process which comprises mixing a free radical catalyst with the product of claim 14 and polymerizing the product by heating at an elevated temperature.

27. The process of claim 26 wherein the diisocyanate is toluene diisocyanate.

28. A process which comprises reacting a mixture consisting essentially of at least a stoichiometric amount of an alcohol selected from the group consisting of allyl alcohol, methallyl alcohol and mixtures thereof with an organic diisocyanate, heating the resulting adduct to about 140 to about 235 degrees centigrade and adding additional diisocyanate sufficient to provide a total of about 1.4 to about 2.2 isocyanato groups per hydroxyl group, and continuing the reaction until there is less than about one weight percent free NCO groups in said product.

29. The process of claim 28 wherein the organic diisocyanate is toluene diisocyanate.

30. The process of claim 28 wherein the product of the process is subjected to vacuum stripping.

31. The process which comprises:
(1) forming an addition product of a mixture consisting essentially of allyl alcohol, methallyl alcohol or mixtures thereof with an organic diisocyanate in a proportion to provide about 1.7 to about 1.96 isocyanato groups per hydroxyl group in a first reactor, heating the addition product to a temperature of about 140 to about 235 degrees centigrade to produce an allyl resin;
(2) discharging the major amount of the allyl resin from said first vessel;
(3) forming an addition product of a mixture consisting essentially of allyl alcohol, methallyl alcohol or mixtures thereof with an organic diisocyanate in a proportion to provide about 1.7 to about 1.96 isocyanato groups per hydroxyl group in a second reactor;
(4) passing the resulting addition product from the second reactor into the heated allyl resin in the first reactor and maintaining the temperature in the first reactor at about 140 to about 235 degrees centigrade to produce additional allyl resin; and
(5) repeating steps (2) to (4).

32. The process of claim 31 wherein the organic diisocyanate is toluene diisocyanate.

33. The process of claim 31 wherein the product of step (4) is subjected to vacuum stripping.

References Cited

UNITED STATES PATENTS

| | | | |
|---|---|---|---|
| 3,297,745 | 1/1967 | Fekete et al. | 260—471 |
| 2,965,615 | 12/1960 | Tess | 260—77.5 AP |
| 3,096,310 | 7/1963 | Heiberger | 260—77.5 NC |
| 3,592,784 | 7/1971 | Brack | 260—2.5 |

FOREIGN PATENTS

| | | |
|---|---|---|
| 827,713 | 2/1960 | Great Britain. |
| 827,714 | 2/1960 | Great Britain. |
| 827,715 | 2/1960 | Great Britain. |
| 843,841 | 8/1960 | Great Britain. |
| 1,075,399 | 7/1967 | Great Britain. |
| 1,092,215 | 11/1967 | Great Britain. |

DONALD E. CZAJA, Primary Examiner

H. S. COCKERAM, Assistant Examiner

U.S. Cl. X.R.

161—190; 260—31.8, 37 N, 77.5 AB, 77.5 AC, 77.5 AM, 77.5 AP